United States Patent [19]
Takayama et al.

[11] Patent Number: 6,085,306
[45] Date of Patent: Jul. 4, 2000

[54] PROCESSOR FOR EXECUTING HIGHLY EFFICIENT VLIW

[75] Inventors: Shuichi Takayama, Takarazuka; Nobuo Higaki, Osaka, both of Japan

[73] Assignee: Matsushita Electric Industrial Co., Ltd, Osaka, Japan

[21] Appl. No.: 09/096,715

[22] Filed: Jun. 12, 1998

[30] Foreign Application Priority Data

Jun. 16, 1997 [JP] Japan .................................... 9-159048

[51] Int. Cl.[7] .................................................. G06F 9/28
[52] U.S. Cl. .............................. 712/24; 712/23; 712/208; 712/210; 712/212
[58] Field of Search .............................. 712/23, 24, 208, 712/209, 210, 212, 223

[56] References Cited

U.S. PATENT DOCUMENTS

| | | | |
|---|---|---|---|
| 5,530,817 | 6/1996 | Masubuchi | 395/375 |
| 5,535,410 | 7/1996 | Watanabe et al. | 395/800 |
| 5,734,913 | 3/1998 | Iwamura et al. | 395/750 |
| 5,748,936 | 5/1998 | Karp et al. | 395/394 |
| 5,761,470 | 6/1998 | Yoshida | 395/386 |
| 5,881,307 | 3/1999 | Park et al. | 395/800.23 |

FOREIGN PATENT DOCUMENTS 3147021 of 0000 Japan .

*Primary Examiner*—Daniel H. Pan
*Assistant Examiner*—Dzung C. Nguyen
*Attorney, Agent, or Firm*—Price Gess & Ubell

[57] ABSTRACT

A 32-bit instruction 50 is composed of a 4-bit format field 51, a 4-bit operation field 52, and two 12-bit operation fields 59 and 60. The 4-bit operation field 52 can only include (1) an operation code "cc" that indicates a branch operation which uses a stored value of the implicitly indicated constant register 36 as the branch address, or (2) a constant "const". The content of the 4-bit operation field 52 is specified by a format code provided in the format field 51.

41 Claims, 16 Drawing Sheets

FIG. 1
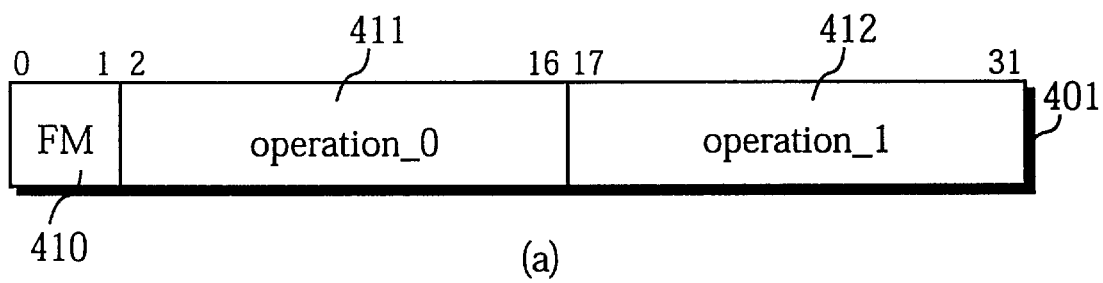
(a)
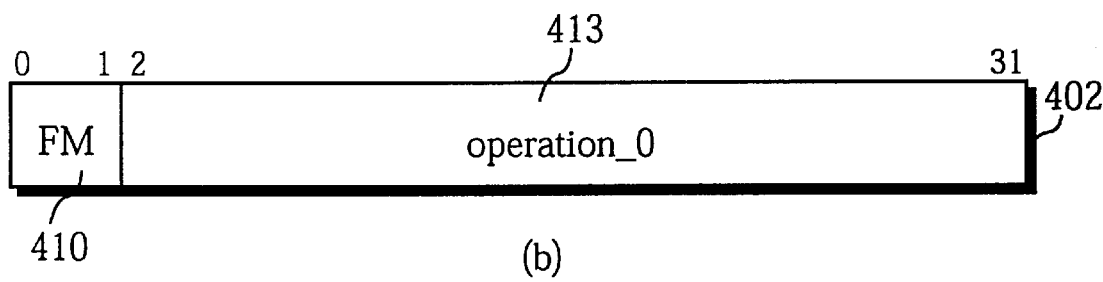
(b)

FIG. 2A

| 0 3 | 4 7 | 8 11 | 12 15 | 16 19 | 20 23 | 24 27 | 28 31 |
|---|---|---|---|---|---|---|---|
| [P0.0] FORMAT CODE | [P1.0] BRANCH/ CONSTANT | [P2.0] OPERATION CODE/ CONSTANT | [P2.1] SOURCE/ CONSTANT | [P2.2] DESTINATION /CONSTANT | [P3.0] OPERATION CODE/ CONSTANT | [P3.1] SOURCE/ CONSTANT | [P3.2] DESTINATION /CONSTANT |
| 51 | 52 | 53 | 54 | 55 | 56 | 57 | 58 |

50 — FIRST OPERATION FIELD 59 — SECOND OPERATION FIELD 60

FIG. 2B

| 0 | const | op1 | Rs1 | Rd1 | op2 | Rs2 | Rd2 |
|---|---|---|---|---|---|---|---|
| 1 | const | op1 | const1 | Rd1 | op2 | Rs2 | Rd2 |
| 2 | cc | op1 | Rs1 | Rd1 | op2 | Rs2 | Rd2 |
| 3 | cc | op1 | const1 | Rd1 | op2 | Rs2 | Rd2 |

FIG. 2C

| 4 | const | const | const | const | op2 | Rs2 | Rd2 |
|---|---|---|---|---|---|---|---|
| 5 | const | op1 | Rs1 | Rd1 | const | const | const |
| 6 | const1 | op1 | const1 | Rd1 | op2 | Rs2 | Rd2 |
| 7 | const2 | op1 | Rs1 | Rd1 | op2 | const2 | Rd2 |
| 8 | const1 | op1 | const1 | Rd1 | op2 | const2 | Rd2 |
| 9 | const2 | op1 | const1 | Rd1 | op2 | const2 | Rd2 |
| A | cc | const2 | const2 | const2 | op2 | const2 | Rd2 |

FIG. 2D

| B | const2 | const2 | const2 | const2 | op2 | const2 | const2 |
|---|---|---|---|---|---|---|---|
| C | reserved | | | | | | |
| D | reserved | | | | | | |
| E | reserved | | | | | | |
| F | reserved | | | | | | |

FIG. 3

| SYMBOL | OPERATION | MNEMONIC NOTATION |
|---|---|---|
| cc | branch | eq, eqi, ne, nei, gt, gti, · · · |
| op1 | ARITHMETIC LOGIC OPERATION | add, sub, mul, and, or, · · · |
| | INTER-REGISTER TRANSFER | mov, movh, movb |
| op2 | ARITHMETIC LOGIC OPERATION | add, sub, mul, and, or, · · · |
| | INTER-REGISTER TRANSFER | mov, movh, movb |
| | REGISTER-MEMORY TRANSFER | ld, ldh, ldb, st, sth, stb |

FIG. 9

| P0.0 | P1.0 | P2.0 | P2.1 | P2.2 | P3.0 | P3.1 | P3.2 |
|------|------|------|------|------|------|------|------|
| fmt 4 |     | 0x8765 |    |     | Sub  | R1   | R0   |
| fmt 4 |     | 0x4321 |    |     | mul  | R2   | R0   |
| fmt 7 | 0   | add    | R15 | R0 | mov  | 0    | R3   |

| P0.0 | P1.0 | P2.0 | P2.1 | P2.2 | P3.0 | P3.1 | P3.2 |
|------|------|------|------|------|------|------|------|
| fmt 0 | 8 | mov | R6 | R1 | mov | R7 | R2 |
| fmt 0 | 7 | add | R0 | R1 | add | R0 | R2 |
| fmt 0 | 6 | mul | R6 | R1 | sub | R7 | R2 |
| fmt 0 | 5 | mov | R8 | R4 | mov | R9 | R5 |
| fmt 7 | 0 | add | R15 | R0 | mov | 0 | R3 |

Columns 74, 75, 76, 77, 78 correspond to the last five columns.

FIG. 13

| P1.0 | P1.1 | P1.2 | P1.3 | P2.0 | P2.1 | P2.2 | P2.3 |
|------|------|------|------|------|------|------|------|
| nop  |      | —    | —    | sub  |      | R1   | R0   | 
| nop  |      | —    | —    | mul  |      | R2   | R0   |
| set hi |    | —    | —    | 0x8765 |    |      | R15  |
| set lo |    | —    | —    | 0x4321 |    |      | R15  |
| add  |      | R15  | R0   | mov  |      | 0    | R3   |

| P1.0 | P1.1 | P1.2 | P1.3 | P2.0 | P2.1 | P2.2 | P2.3 |
|------|------|------|------|------|------|------|------|
| mov  |      | R6   | R1   | mov  |      | R7   | R2   |
| add  |      | R0   | R1   | add  |      | R0   | R2   |
| mul  |      | R6   | R1   | sub  |      | R7   | R2   |
| mov  |      | R8   | R4   | mov  |      | R9   | R5   |
| add  |      | —    |      | 0x8765 |    |      | R0   |
| nop  |      | —    | —    | mov  |      | 0    | R3   |

↓110 ↓111 ↓112 ↓113 ↓114 ↓115

PROCESSOR FOR EXECUTING HIGHLY EFFICIENT VLIW

BACKGROUND OF THE INVENTION (1) Field of the Invention

The present invention relates to a processor with VLIW (Very Long Instruction Word) architecture, and in particular to a processor that executes instructions with comparatively short word length and high code efficiency.

(2) Description of the Prior Art

With the increase in demand for multimedia devices and the miniaturization of electronic circuits in recent years, there has been a growing need for microprocessors that can process multimedia data, such as audio data and image data, at high speed. One kind of processors that are capable of meeting this need are processors that use VLIW architecture, these being hereinafter referred to as "VLIW processors".

VLIW processors include a number of internal operation units and so are able to simultaneously execute a number of operations in one VLIW in parallel. Such VLIW are generated by a compiler that investigates the extent to which parallel processing is possible at the source program level and performs scheduling. For embedded microprocessors used in consumer appliances, however, it is important to suppress the code size of programs, so that 256-bit VLIW, with their high incidence of no-operation instructions (hereinafter referred to as "NOP instructions") and resulting poor code efficiency, are far from ideal.

One example of a VLIW processor that executes instructions with relative short word length is Japanese Laid-Open Patent Application H09-26878. This technique teaches a data processing apparatus that is a VLIW processor for executing 32-bit instructions that can simultaneously indicate a maximum of two operations.

FIGS. 1A and 1B show the instruction format of the stated technique, with FIG. 1A showing the instruction format for simultaneously indicating two operations and FIG. 1B showing the instruction format for indicating only one operation. This technique aims to improve code efficiency by including a 2-bit value in the format field 410 that shows the number of operations in each instruction and the execution order.

The indication of a maximum of two operations by a single 32-bit instruction, however, does not achieve a sufficient degree of parallelism. There is also the problem of decreases in code efficiency of instructions when performing an operation using a constant that exceeds a given word length. As one example, when a 32-bit constant is split into an upper 16 bits and a lower 16 bits so that it can be set into registers, two 32-bit instructions are required just to indicate an operation using this constant.

SUMMARY OF THE INVENTION

In view of the stated problems, it is a first object of the present invention to provide a VLIW processor that executes instructions of comparatively short word length, but which have a high degree of parallelism and a highly efficient code structure so that several operations can be simultaneously indicated. As one example, three or more operations can be indicated by a single 32-bit instruction.

It is a second object of the present invention to provide a VLIW processor for executing instructions of a comparatively short word length that have a structure whereby the overall code efficiency will be comparatively unaffected even when handling constants of comparatively long word length.

The first object can be realized by a VLIW (Very Long Instruction Word) processor that decodes and executes an instruction that has at least two operation fields, of which a first operation field can only include one operation code for specifying an operation type and a second operation field includes a combination of one operation code and at least one operand used in an operation indicated by the second operation field, the VLIW processor including: a first decoding unit for decoding the operation code in the first operation field; a first execution unit for executing an operation indicated by the operation code in the first operation field in accordance with a decoding result of the first decoding unit; a second decoding unit for decoding the operation code in the second operation field; and a second execution unit for executing the operation indicated by the operation code in the second operation field on data which is indicated by the operands in the second operation field, in accordance with a decoding result of the second decoding unit.

By doing so, since at least one operation in the instruction can be indicated by merely inserting an operation code without an explicit indication of an operand, the word length of instructions can be reduced. As a result, a VLIW processor that executes instructions of comparatively short word length, but which have a highly efficient code structure so that several operations can be simultaneously indicated is achieved.

Here, a number of bits occupied by the operation code in the first operation field may be equal to a number of bits occupied by the operation code in the second operation field.

As a result, all operation codes that are included in an instruction will be composed of the same number of bits, which simplifies components such as the decoder circuits.

Here, the instruction may include three operation fields, wherein a third operation field in the three operation fields may occupy a same number of bits as the second operation field and may include a combination of one operation code and at least one operand, the VLIW processor further including: a third decoding unit which decodes, when an operation code is present in the third operation field, the operation code in the third operation field; and a third executing unit for executing an operation indicated by the operation code in the third operation field on data which is indicated by the operands in the third operation field, in accordance with a decoding result of the third decoding unit.

As a result, a VLIW processor with a high degree of parallelism whereby three operations can be simultaneously performed can be achieved.

Here, the first executing unit may control a control flow of a program including the instruction.

As a result, branch operations which do not normally require a large number of bits can be assigned to a short operation field. This means an instruction set with high code efficiency can be defined.

Here, the second executing unit may control transfer of the data that is indicated by the operands included in the second operation field, and the third executing unit may control executes an arithmetic logic operation on the data that is indicated by the operands included in the third operation field.

As a result, data transfer to and from an external memory can be indicated by a single operation in an instruction, so that the operand access circuit that should be provided in a VLIW processor can be simplified.

The second object of the present invention can be achieved by a VLIW processor that decodes and executes an instruction that has at least two operation fields, of which a first operation field can only include one of (i) a single operation code for specifying an operation type and (ii) a constant, and a second operation field includes one of (i) a combination of one operation code and at least one operand used in an operation indicated by the second operation field and (ii) a constant, the VLIW processor including: a first decoding unit which decodes, when an operation code is present in the first operation field, the operation code in the first operation field; a first executing unit for executing an operation indicated by the operation code in the first operation field, in accordance with a decoding result of the first decoding unit; a second decoding unit which decodes, when an operation code is present in the second operation field, the operation code in the second operation field; and a second executing unit for executing an operation indicated by the operation code in the second operation field on data which is indicated by the operands in the second operation field, in accordance with a decoding result of the second decoding unit.

With the stated construction, when it is necessary to put meaningless code into an operation field in an instruction, a constant that will be used by a different operation may instead be inserted, so that a VLIW processor can be realized for executing instructions which have a high code efficiency despite having only a short word length.

Here, the instruction also includes a format field including a format code indicating whether only a constant is located in the first operation field and whether only a constant is located in the second operation field, the VLIW processor further including: a format decoding unit for decoding the format code; and a constant storage unit for extracting, when a decoding result of the format decoding unit shows that only a constant is present in at least one of the first operation field and the second operation field, the constant in the instruction and storing the extracted constant.

As a result, constants placed in an operation field can be stored in the constant storage unit for use by an operation in a later instruction, so that decreases in code efficiency can be avoided even when handling constants of a comparatively long word length using instructions of a comparatively short word length.

Here, the format field, the first operation field, the operation code in the second operation field, each operand in the second operation field, the operation code in the third operation field, and each operand in the third operation field may each occupy n bits in the instruction.

With the stated construction, all of the fields that compose an instruction have the same number of bits, which enables the internal circuits of the VLIW processor to be simplified.

Here, a VLIW processor may include: a fetch unit for fetching an L-bit instruction that includes n operation fields; and n operation units which are each associated with a different one of the n operation fields in the fetched instruction and each independently execute an operation indicated in the associated operation field in parallel with each other; the VLIW processor being characterized by the n operation fields not all being a same size, and by L not being an integer multiple of n.

With the stated construction, there is no need for all of the operation fields in an instruction to have the same word length, making it possible to define instructions with high code efficiency. As a result, a VLIW processor that executes instructions of comparatively short word length, but which have a highly efficient code structure so that several operations can be simultaneously indicated is achieved.

Here, n may be 3 and L may be 32.

The stated construction realizes a VLIW processor with a high degree of parallelism whereby three operations that are specified by a single 32-bit instruction can be simultaneously performed.

Here, a number of operands included in at least one operation field out of the n operation fields may be different to a number of operands in other operation fields in the n operation fields.

With the stated construction, there is no need for every operation field in an instruction to have the same number of operands, so that instruction formats with a high degree of code efficiency can be defined.

Here, the n operation fields may include at least one operation field composed of only an operation code and at least one operation field composed of an operation code and at least one operand.

With the stated construction, the instruction word length is shorter than the case when every operation field in an instruction contains a combination of an operation code and operands, so that a VLIW processor that executes instructions which have a highly efficient code construction can be realized.

As described above, the present invention realizes a VLIW processor that executes instructions of comparatively short word length but which have a highly efficient code structure that allows several operations to be specified by a single instruction. This effect is especially noticeable for embedded processors that process multimedia data.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 1A and 1B show instruction formats used under the prior art, with FIG. 1A showing an instruction format where two operations are simultaneously indicated and FIG. 1B showing an instruction format where one only operation is indicated;

FIG. 2A shows the field structure of an instruction that is executed by the processor of the present invention;

FIGS. 2B to 2D show sixteen types of instruction format, with FIG. 2B showing triple operation instructions, FIG. 2C showing twin operation instructions, and FIG. 2D showing single operation instructions;

FIG. 3 is a table showing specific operations that are indicated by the three types of operation code, "cc", "op1", and "op2", that are used in FIGS. 2B to 2D;

FIG. 9 shows an example of a program that has the present processor execute the procedure shown in FIG. 8;

FIG. 11 is an example of a program that has the present processor execute a procedure that handles a 16-bit constant;

FIG. 13 shows an example of a program that has a standard processor perform the same procedure as the program shown in FIG. 9;

FIG. 14 shows an example of a program that has a standard processor execute the same procedure as the program shown in FIG. 11;

DESCRIPTION OF THE PREFERRED EMBODIMENT

Figure 4:
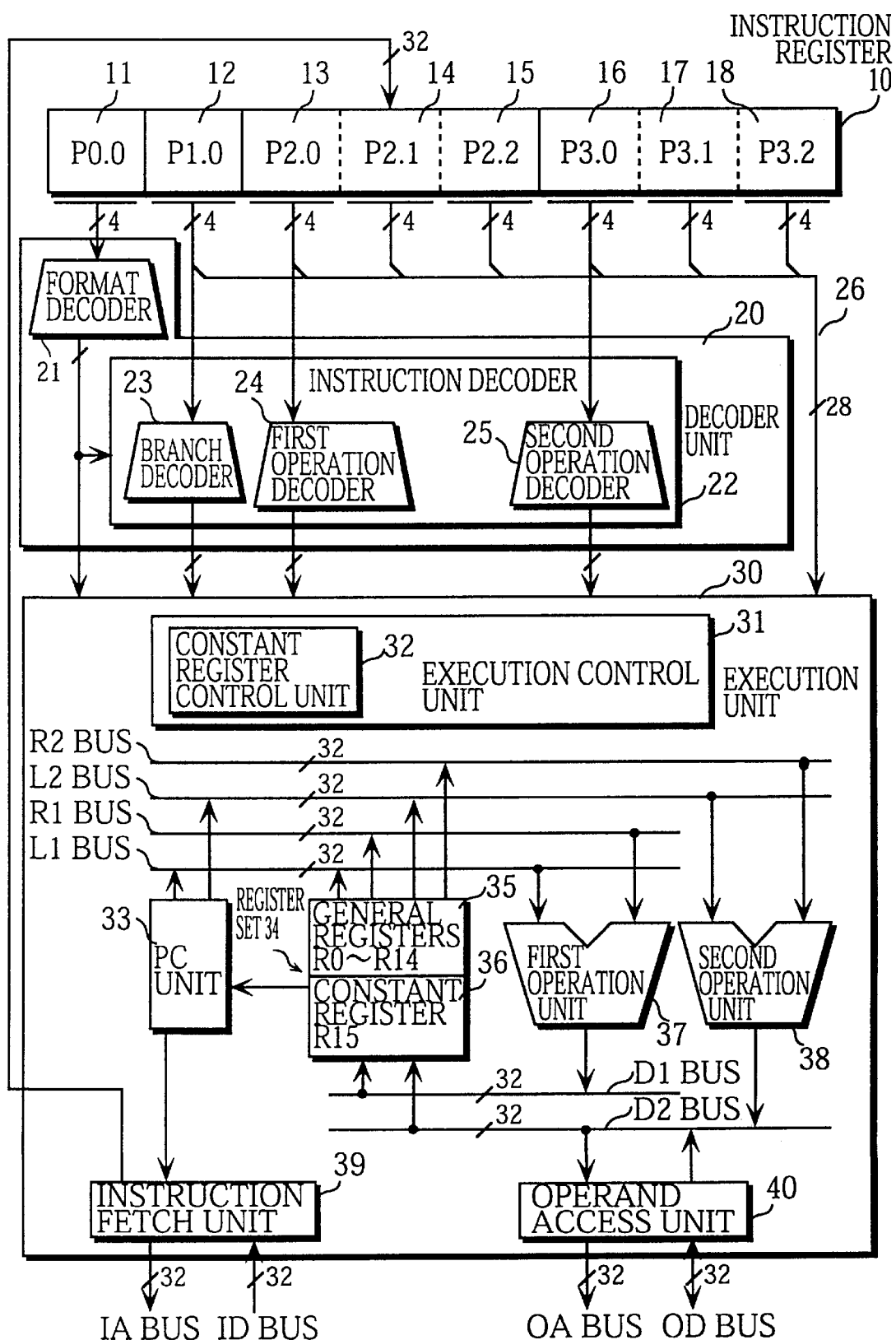
FIG. 4 is a block diagram showing the hardware construction of the present processor.

An embodiment of the processor of the present invention is described below with reference to the figures. In this embodiment, the expression "instruction" refers to a set of code that is decoded and executed by the present processor simultaneously and in parallel, with the expression "operation" refers to a unit of processing, such as an arithmetic operation, a logic operation, a transfer, or a branch, which is executed by the present processor in parallel, as well as to the code which indicates each unit of processing.

Instruction Format

First, the structure of the instructions that are decoded and executed by the present processor will be described. The present processor is a VLIW processor that decodes and executes instructions with a fixed word length of 32 bits.

FIG. 2A shows the field structure of an instruction 50 to be executed by the present processor. FIGS. 2B to 2D, meanwhile, show sixteen instruction formats. Of these, the instruction formats in FIG. 2B simultaneously indicate three operations, the instruction formats in FIG. 2C two operations, and the instruction formats in FIG. 2D a single operation.

This instruction 50 has a fixed word length of 32 bits and is composed of eight 4-bit physical fields shown in order starting from the MSB (Most Significant Bit) as P0.0 field 51, P1.0 field 52, ... P3.2 field 58 in FIG. 2A. Of these, the range from the P2.0 field 53 to the P2.2 field 55 is called the first operation field 59, while the range from the P3.0 field 56 to the P3.2 field 58 is called the second operation field 60.

In FIGS. 2B to 2D, the legend "const" indicates a constant, and depending on the operation in which it is used, this can be a numeric constant or a character constant such as an immediate, an absolute address, or a displacement. The legend "op" represents an operation code that indicates an operation type, while the legend "Rs" indicates the register used as the source operand, "Rd" the register used as the destination operand, and "cc" an operation code indicating a branch operation that uses the stored value of a specialized 32-bit register provided in the present processor (the constant register 36 shown in FIG. 4) as the absolute address or relative address (displacement) of a branch destination.

The numerical values given directly after the codes described above show values that are used in the operation in either the first operation field 59 or the second operation field 60. As one example, for the instruction format with the format code "6", the 4-bit constant "const1" located in the P1.0 field 52 and the 4-bit constant "const1" located in the P2.1 field 54 are combined to form an 8-bit constant that is the source operand corresponding to the operation code "op1" of the first operation field 59.

The constant "const" which is not appended with a number represents a constant to be stored in the specialized 32-bit register provided in the present processor (the constant register 36 shown in FIG. 4). As one example, for the instruction format with the format code "0", the 4-bit constant "const" located in the P1.0 field 52 implies the constant that is to be stored in the constant register 36 which is implicitly indicated.

FIG. 3 shows specific examples of the operations that can be indicated by the three kinds of operation code "cc", "op1", and "op2" given in FIGS. 2B to 2D. These operations are described in detail below.

The 4-bit operation code "cc" indicates one out of sixteen types of branch instruction. Each branch instruction is specified as a branch condition and a branch format. Examples of branch conditions include "equal to ('eq')", "not equal to ('neq')", and "greater than ('gt')". The branch format can be a format where the stored value of the constant register 36 serves as the absolute address of the branch destination (denoted by having no "i" attached to the instruction mnemonic), or a format where the stored value of the constant register 36 serves as a relative address (denoted by having "i" attached to the instruction mnemonic). As one example, the operation code "eq" represents an operation that branches to a destination indicated through absolute addressing when a preceding comparison finds the compared values to be equal, while the operation code "eqi" represents an operation that branches to a destination indicated through relative addressing when a preceding comparison finds the compared values to be equal.

The 4-bit operand "op1" can be used to indicate an arithmetic logic operation, such as any of an "add" (addition), a "sub" (subtraction), a "mul" (multiplication), an "and" (logical AND), or an "or" (logical OR), or an operation that is an inter-register transfer, such as any of a "mov" (transfer of word (32-bit) data), a "movh (transfer of halfword data), or a "movb" (transfer of one byte data).

The 4-bit operand "op2" can be used to indicate any of the arithmetic logic operations or inter-register transfers that can be indicated by the operand "op1", but can also be used to indicate a register-memory transfer operation such as an "ld" (load of one word data from memory into registers) or an "st" (store of one word data into memory from registers).

The characteristic features of the fields 51, 52, 59, and 60 shown in FIG. 2A are described below.

The P0.0 field 51 holds a 4-bit format code that specifies the format of the instruction 50. More specifically, this P0.0 field 51 specifies one of the sixteen instruction formats shown in FIGS. 2B to 2D.

The P1.0 field 52 is a field holds a constant or an operation code for a branch operation. When a constant is located in the P1.0 field 52 (such as in the instructions with the format codes "0", "1", and "4" to "9") there are cases where the constant is to be stored in the constant register 36 (such as in the instructions with the format codes "0", "1", "4", and "5"), and cases where the constant forms one part of the operand in the first operation field 59 or the second operation field 60 (such as in the instructions with the format codes "5", "7", "8", "9", and "B"). When the constant in the P1.0 field 52 is to be stored in the constant register 36, there are cases where only this 4-bit constant is stored (such as in the instructions with the format codes "0" and "1"), and cases where this constant is stored together with a 12-bit constant located in either the first operation field 59 or the second operation field 60 (such as in the instructions with the format codes "4" and "5").

When the operation code "cc" for branching is given in the P1.0 field 52 (such as in the instructions with the format codes "2", "3", and "A"), this indicates a branch operation that uses the stored value of the constant register 36 as the absolute address or relative address (displacement) of a branch destination.

The first operation field 59 holds either a constant or a combination of (a) an operation code for indicating an operation (such as an arithmetic logic operation or inter-register transfer) that does not involve data transfer between the present processor and the periphery (memory), and (b) source and destination operands for the operation.

The second operation field 60 can hold the same content as the first operation field 59 described above, but can also alternatively hold a combination of (a) an operation code for indicating an operation (such as memory-register transfer) that involves data transfer between the present processor and the periphery and (b) operands for the operation.

The above assignment of different operation types to certain fields rests on the premises for the present von Neumann-type processor whereby it is not necessary to process two or more branch operations simultaneously, and that only one input/output port (the operand access unit 40 shown in FIG. 4) for transferring operands is provided between the present processor and the periphery (memory).

The instruction formats shown in FIGS. 2B to 2D have the following characteristic features.

First, by focusing on the constant "const", it can be seen that there are the following three types of instruction for storing a constant in the constant register 36.

(1) When the format code is "0" or "1":
In these instructions, the 4-bit constant located in the P1.0 field 52 is stored in the constant register 36.

(2) When the format code is "4":
In this instruction, a 16-bit constant located in the P1.0 field 52 to P2.2 field 55 is stored in the constant register 36.

(3) When the format code is "5":
In this instruction, a 16-bit constant located in the P1.0 field 52 and the P3.0 field 56 to P3.2 field 58 is stored in the constant register 36.

Secondly, for the present processor, a maximum of three operations can be indicated by a single instruction, and in this case, as can be seen from the triple operation formats shown in FIG. 2B, either of the following combinations of operation types can be used.

(1) One operation that sets a 4-bit constant into the constant register 36 and two standard operations (when the format code is "0" or "1").

(2) One operation that performs branching using the value set in the constant register 36 as an absolute address or a relative address and two standard operations (when the format code "2" or "3").

As described above, the instructions of present processor have a highly efficient field structure that enables a maximum of three operations to be simultaneously indicated by a single 32-bit instruction.

Hardware Construction of the Processor

The hardware construction of the present processor is described below.

FIG. 4 is a block diagram showing the hardware construction of the processor of the present invention. As described above, this processor is a VLIW processor that can execute a maximum of three operations in parallel. The construction of the processor can be roughly divided into an instruction register 10, a decoder unit 20, and an execution unit 30.

The instruction register 10 is a 32-bit register that stores one instruction that has been sent from the instruction fetch unit 39.

The decoder unit 20 decodes the instruction held in the instruction register 10 and performs output on control lines to the execution unit 30 in accordance with the decoding result. This decoder unit 20 can itself be roughly divided into the format decoder 21 and the instruction decoder 22.

The instruction decoder 22 is composed of a branch decoder 23 that decodes the "cc" operation code held in the P1.0 field 52 and controls the PC unit 33 accordingly, a first operation decoder 24 that decodes the operation code held in the P2.0 field 13 and controls the first operation unit 37 accordingly, and a second operation decoder 25 that decodes the operation code held in the P3.0 field 16 and controls the second operation unit 38 and operand access unit 40 accordingly.

The format decoder 21 decodes the 4-bit format code held in the P0.0 field 11 to identify the instruction format of the instruction held in the instruction register 10 as one of the sixteen possible instruction formats shown in FIGS. 2B to 2D. In accordance with the decoding result, the format decoder 21 permits or prohibits decoding operations by the branch decoder 23, the first operation decoder 24, and the second operation decoder 25, and activates the register control unit 32 of the execution unit 30.

The format decoder 21, the branch decoder 23, the first operation decoder 24, and the second operation decoder 25 fundamentally decode one operation in one cycle and send control signals to the execution unit 30. Here, the 26-bit constant signal line 26 that connects the instruction register 10 with the execution unit 30 is a bus for transferring constants and operands located in the instruction register 10 to the execution unit 30.

The execution unit 30 operates according to the decoding result of the decoder unit 20 and is a circuit that is capable of executing a maximum of three operations in parallel. This execution unit 30 is composed of an execution control unit 31, a PC unit 33, a register set 34, a first operation unit 37, a second operation unit 38, an instruction fetch unit 39, and an operand access unit 40. Out of the components in the execution unit 30, the constructions of the register control unit 32, the PC unit 33, and the constant register 36 are shown in greater detail in the other drawings.

The execution control unit 31 refers in general to the control circuits and wiring for controlling the components numbered 33 to 40 in the execution unit 30 according to the decoding result of the decoder unit 20. This execution control unit 31 includes the components that are normally provided in a processor, such as circuits for timing control, operation permission/prohibition control, status management, and interruption control, as well as the constant register control unit 32 which is a characteristic component of the present processor. The constant register control unit 32 performs control so that a 4- or 16-bit constant "const" held in the instruction register 10 is stored in the constant register 36 based on indications given by the format decoder 21.

The PC (Program Counter) unit 33 operates under the control of the branch decoder 23, and outputs the address in an external memory (not illustrated) of the next instruction to be decoded and executed to the instruction fetch unit 39.

The instruction fetch unit 39 fetches an instruction block from the external memory (not illustrated) via a 32-bit IA (Instruction Address) bus and a 32-bit ID (Instruction Data) bus. The instruction fetch unit 39 stores the fetched instruction block in an internal instruction cache and supplies the instruction which corresponds to the address outputted by the PC unit 33 to the instruction register 10.

The register set 34 is composed of fifteen 32-bit general registers 35 and one 32-bit constant register 36. In accordance with the decoding results of the first operation decoder 24 and the second operation decoder 25, the values which are stored in these sixteen registers 35 and 36 are transferred to the first operation unit 37 and the second operation unit 38 where an operation is performed or alternatively the values are allowed to pass, before being sent to the register set 34 or the operand access unit 40. Here, in addition to being used in the operations performed by the first operation unit 37 and the second operation unit 38, the value stored in the constant register 36 can also be transferred to the PC unit 33, where it is used to generate an effective address that is used as a branch destination.

The first operation unit 37 internally includes an ALU (Arithmetic Logic Unit) for performing arithmetic logic operations on two 32-bit sets of data and a multiplier for performing multiplications on two 32-bit sets of data. This first operation unit 37 is capable of executing two types of operation (namely, arithmetic logic operations, and inter-register transfer operations) under the control of the first operation decoder 24.

The second operation unit 38 internally includes an ALU for performing arithmetic logic operations on two 32-bit sets of data and a multiplier for performing multiplications on two 32-bit sets of data, in the same way as the first operation unit 37. This second operation unit 38 is capable of executing two types of operation (namely, arithmetic logic operations, and inter-register transfer operations) under the control of the second operation decoder 25.

The operand access unit 40 operates under the control of the second operation decoder 25 and is a circuit that transfers operands between the register set 34 and the external memory (not illustrated). The operand access unit 40 internally includes a buffer for storing operands and operand addresses. As a specific example, when the operation code "1d" is in the P3.1 field 16 of the instruction register 10, one word of data that is located in the external memory is loaded via the operand access unit 40 into one of the registers in the register set 34. When the operation code "st" is present, meanwhile, the stored value of one of the registers in the register set 34 is stored in the external memory.

The PC unit 33, the register set 34, the first operation unit 37, the second operation unit 38, and the operand access unit 40 are connected by internal buses (the L1 bus, the R1 bus, the L2 bus, the R2 bus, the D1 bus, and the D2 bus) as shown in FIG. 4. Here, the L1 bus and the R1 bus are each connected a respective one of the two input ports of the first operation unit 37, the L2 bus and the R2 bus are each connected to a respective one of the two input ports of the second operation unit 38, and the D1 bus and the D2 bus are respectively connected to an output port of the first operation unit 37 and the second operation unit 38.

Detailed Construction of the Constant Register 36 and its Periphery

The following is a detailed description of the construction of the constant register 36 and of the peripheral circuits.

Figure 5:
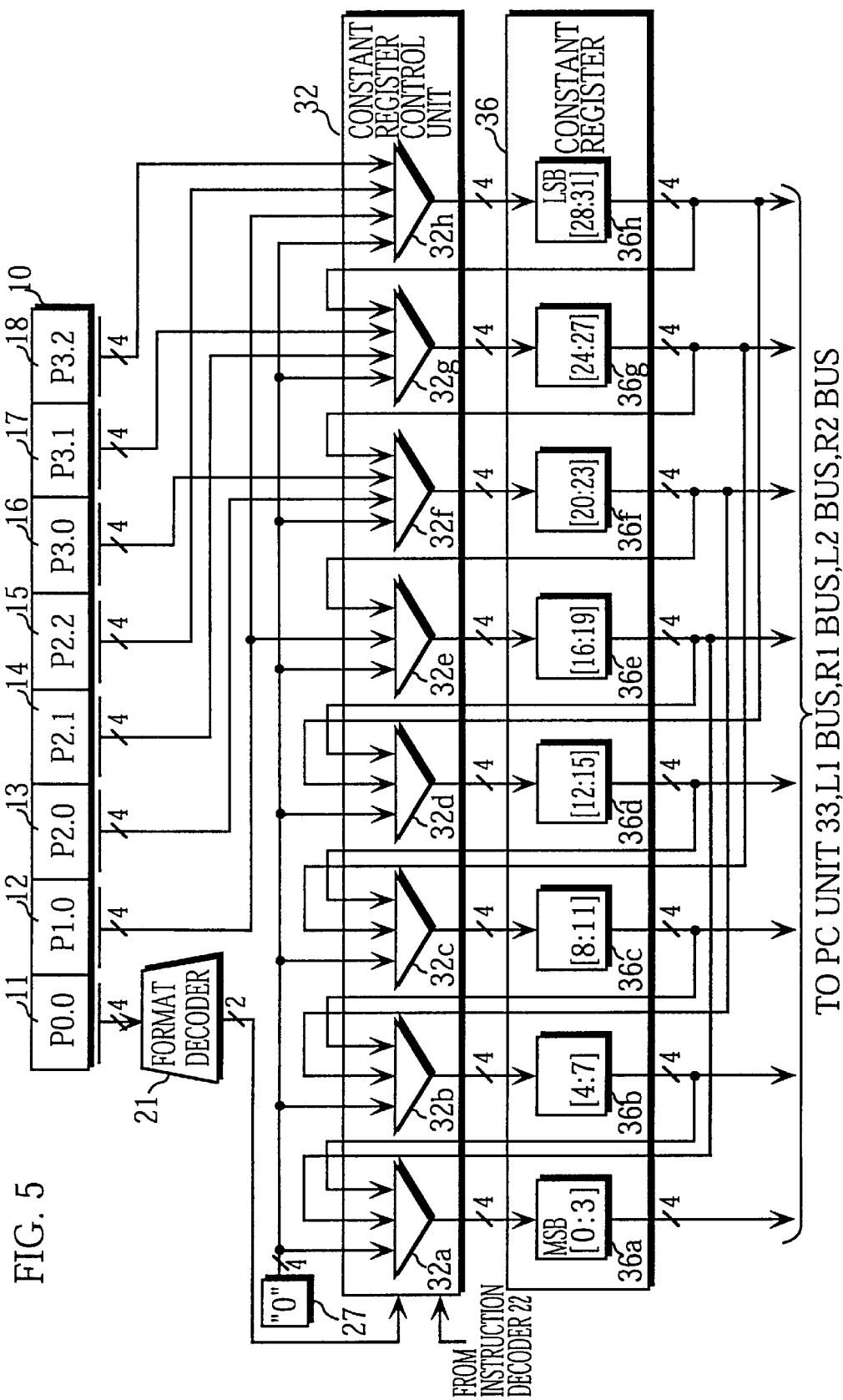
FIG. 5 is a block diagram showing the detailed construction of the constant register 36 of the present processor and the peripheral circuits.

FIG. 5 is a block diagram showing the detailed construction of the constant register 36 and of the peripheral circuits. Note here that the fixed value ("0") 27 in the drawings refers to fixed wiring for four signal lines carrying the constant "0".

The constant register control unit 32 is composed of five 3-input selectors 32a–32e and three 4-input selectors 32f–32h, while the constant register 36 is composed of eight 4-bit registers 36a–36h. Here, each set of input and output data is 4-bit parallel data.

In accordance with control signals from the format decoder 21 and the instruction decoder 22, the constant register control unit 32 controls the eight input selectors 32a–32h so that a constant stored in the instruction register 10 or zeros are stored in the constant register 36 according to one of the four storage methods given below.

FIGS. 6A to 6D show the four possible storage methods in the present embodiment.

Figure 6A:
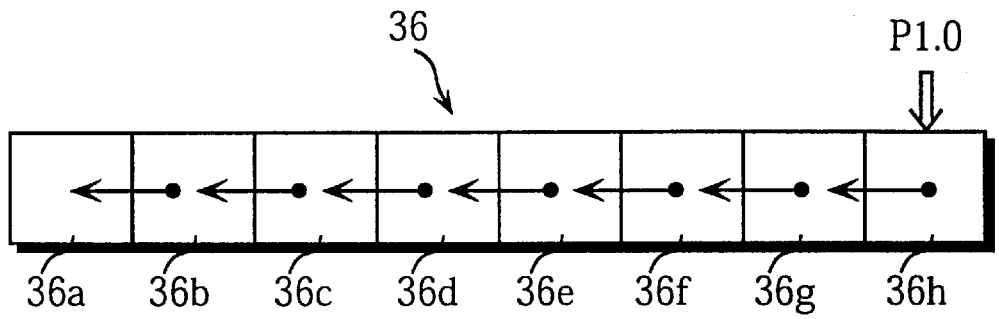
FIGS. 6A to 6D are representations of different methods for storing a constant by the constant register control unit 32 shown in FIG. 5, with FIG. 6A showing the case when the format code is "0" or "1", FIG. 6B showing the case when the format code is "4", FIG. 6C showing the case when the format code is "5", and FIG. 6D showing the case when the format code is "2", "3", or "A"

FIG. 6A shows a storage method for when the format decoder 21 detects that the value stored in the P0.0 field 11 is "0" or "1". This equates to the case when only a 4-bit constant located in the P1.0 field 12 is stored in the constant register 36. More specifically, the data that is stored in the constant register 36 is shifted upwards (to the left in FIG. 6A) in 4-bit units and the 4-bit constant stored in the P1.0 field 12 of the instruction register 10 is stored in the lowest-order 4-bit register 36h of the constant register 36.

Figure 6B:
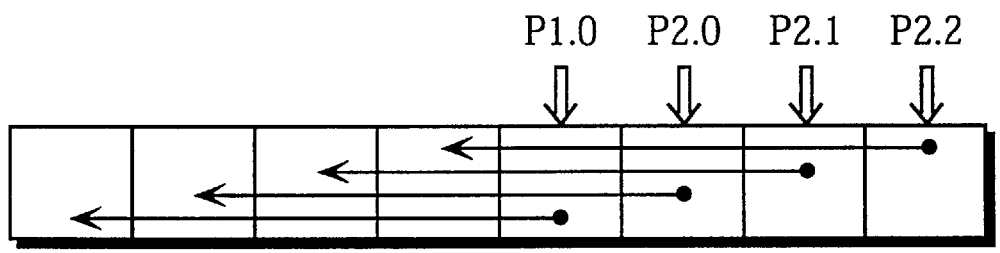

FIG. 6B shows a storage method for when the format decoder 21 detects that the value stored in the P0.0 field 11 is "4". This equates to the case when a 16-bit constant located between the P1.0 field 12 and the P2.2 field 15 is stored in the constant register 36. More specifically, the data that is stored in the lower 16 bits 36e–36h of the constant register 36 is shifted to the upper 16 bits 36a–36d and the 16-bit constant located between the P1.0 field 12 and the P2.2 field 15 of the instruction register 10 is stored in the lowest-order 16-bits 36e–36h of the constant register 36.

Figure 6C:
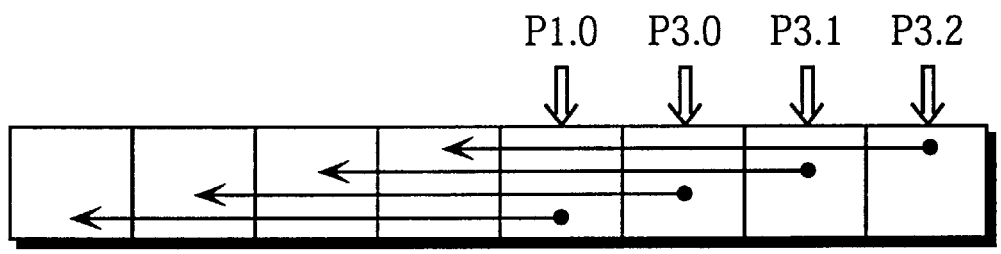

FIG. 6C shows a storage method for when the format decoder 21 detects that the value stored in the P0.0 field 11 is "5". This equates to the case when a 16-bit constant located in the P1.0 field 12 and between the P3.0 field 16 and the P3.2 field 18 is stored in the constant register 36. More specifically, the data that is stored in the lower 16 bits 36e–36h of the constant register 36 is shifted to the upper 16 bits 36a–36d and the 16-bit constant located in the P1.0 field 12 and between the P3.0 field 16 and the P3.2 field 18 of the instruction register 10 is stored in the lowest-order 16-bits 36e–36h of the constant register 36.

Figure 6D:
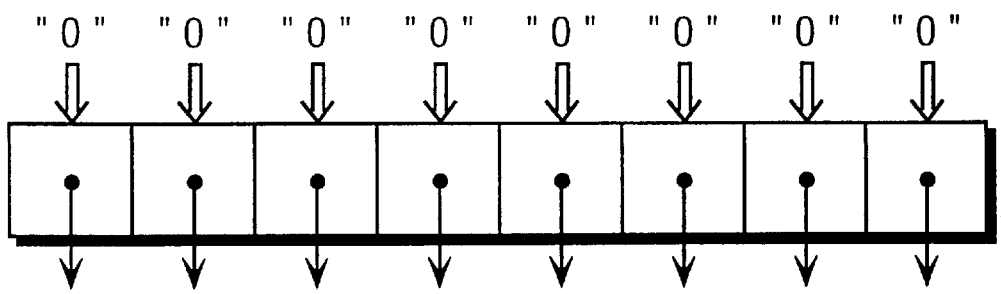

FIG. 6D shows a storage method for when the format decoder 21 detects that the value stored in the P0.0 field 11 is "2", "3", or "A", or when the instruction decoder 22 detects that the constant register (R15) is indicated by at least one of the P2.1 field 14, the P2.2 field 15, the P3.2 field 17, and the P3.3 field 18. This equates to the case where the value stored in the constant register 36 is reset to all zeros (which is to say, the constant register 36 is cleared), after the stored value of the constant register 36 has been used by at least one of a branch operation located in the P1.0 field 12, an operation in the first operation field 59 or an operation in the second operation field 60. More specifically, immediately after the stored value of the constant register 36 has been read out to one of the PC unit 33, the first operation unit 37 or the second operation unit 38, a 32-bit constant with the value "0" is written into the constant register 36.

Here, the value in the constant register 36 is cleared after being used to ensure that a value with a zero extension is always stored in the constant register 36. A zero extension here refers to the insertion of zeros that is performed when the effective number of bits of a value is below a predetermined number of bits, with zeros being inserted into the higher bit positions so that the value takes up the predetermined number of bits.

As described above, when the value in the P0.0 field 11 of the instruction register 10 is "0", "1", "4", or "5", the constant that is already stored in the constant register 36 is shifted and a new value is stored. Also, after the value stored in the constant register 36 is read out and used, this stored value is deleted. By doing so, the constant register 36 is able to successively accumulate constants until the next time its stored content is used.

Detailed Construction of the PC Unit 33

The following is a detailed description of the construction of the PC unit 33.

Figure 7:
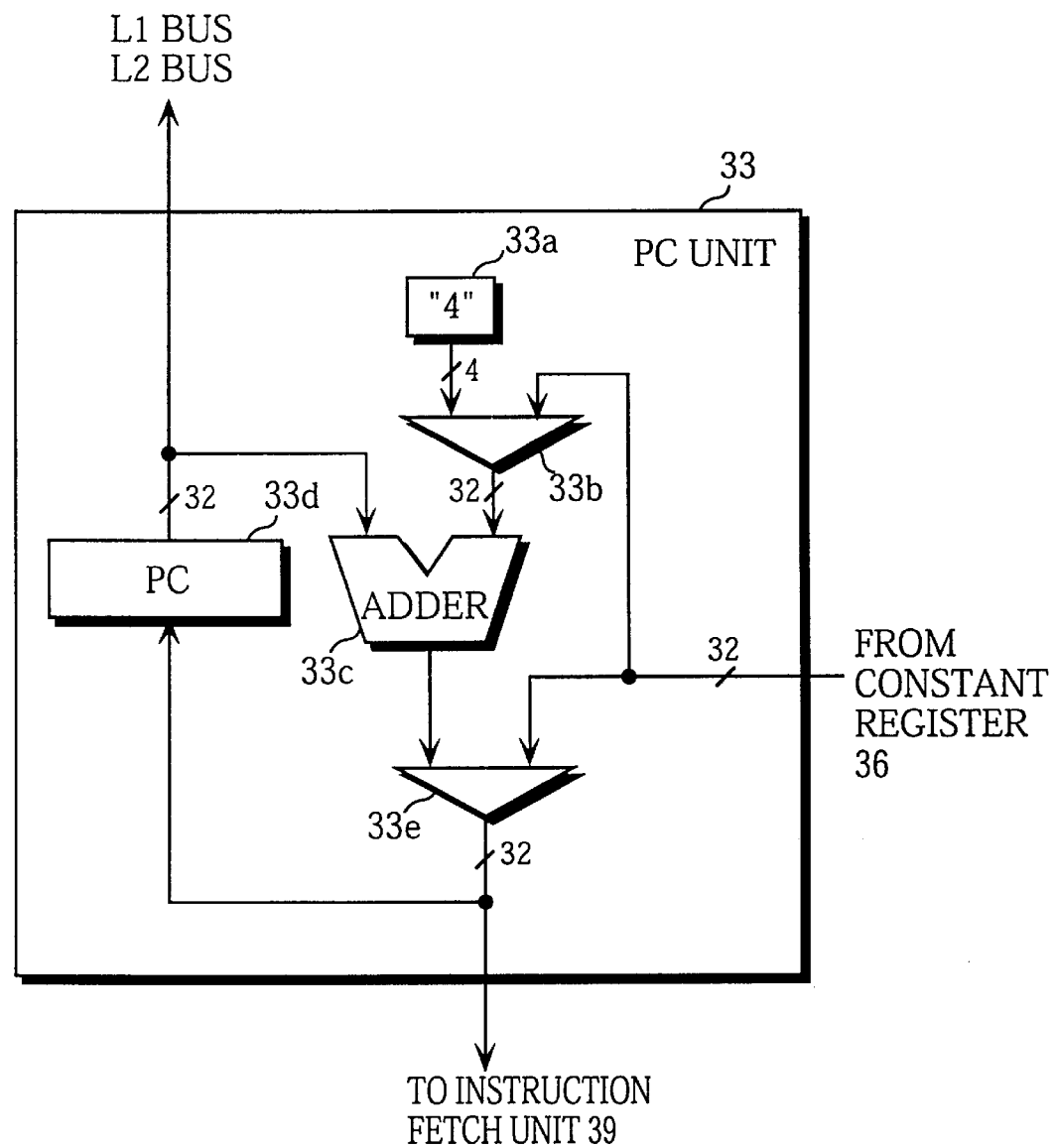
FIG. 7 is a block diagram showing the detailed construction of the PC unit 33 of the present processor.

FIG. 7 is a block diagram showing the construction of the PC unit 33 in detail. As shown in FIG. 7, the PC unit 33 is composed of a fixed value ("4") 33a, that is wiring which permanently carries the constant "4", a 2-input selector 33b, an adder 33c, a PC (Program Counter) 33d for storing an address of the next instruction to be decoded and executed, and a 4-input selector 33e.

In the PC unit 33, the selectors 33b and 33e operate in accordance with control signals from the decoder unit 20, so that the selector 33e outputs one of the following three types of values to the instruction fetch unit 39 as the effective address.

1. A value where "4" is added to the content of the PC 33d

This corresponds to when no branch is taken and a next instruction is to be executed in order, which is to say, when the decoding result for a present instruction is that no branch operation is indicated. The reason "4" is added is that the length of one instruction is four bytes, which is to say, 32 bits.

2. A value where the content of the constant register 36 is added to the content of the PC 33d

This corresponds to when the content of the constant register 36 is used as a relative address for branching, such as when the decoding result of the branch decoder 23 is that the P1.0 field 12 indicates a branch to a relative address.

3. A value given as the content of the constant register 36

This corresponds to when the content of the constant register 36 is used as an absolute address for branching, such as when the decoding result of the branch decoder 23 is that the P1.0 field 12 indicates a branch to an absolute address.

As described above, the PC unit 33 includes a specialized adder 33c, and is constructed to directly use the value stored by the constant register 36, so that branch execution control can be performed with the stored value of the constant register 36 as a relative address or an absolute address in parallel with and independent of the operations performed by the first operation unit 37 and the second operation unit 38.

Operation of the Processor

The following is a description of the operation of the present processor when decoding and executing specific operations.

Figure 8:
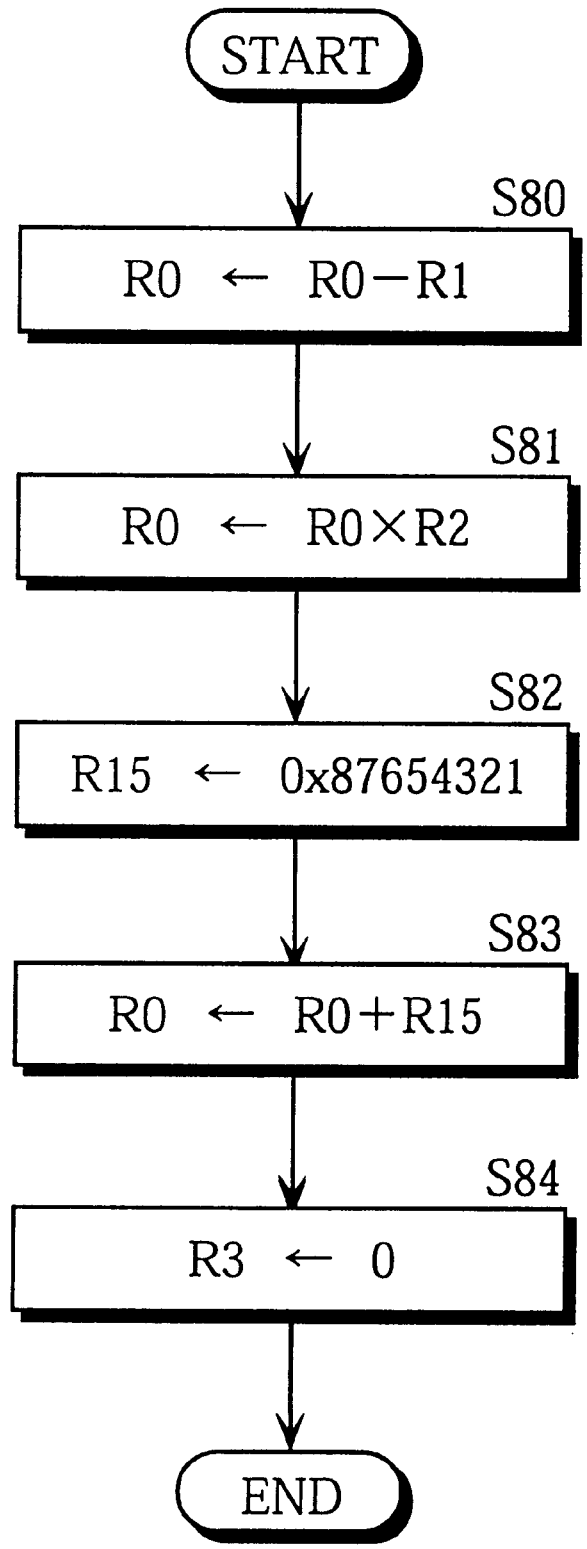
FIG. 8 is a flowchart showing a procedure that handles a 32-bit constant.

FIG. 8 is a flowchart showing an example of a procedure that handles 32-bit constants. First, the difference between the stored values of the registers R0 and R1 is found (step S80), and the result is multiplied by the stored value of R2 (step S81). The 32-bit constant "0x87654321" (the value "87654321" in hexadecimal) is then added to the result of this (steps S82, S83), and finally the register RO is cleared (step S84).

FIG. 9 shows an example of a program that has the present processor perform the procedure shown in FIG. 8. The program is composed of the three instructions 71–73. In FIG. 9, one line corresponds to one instruction, and the content of each instruction is shown by mnemonics located in the separate fields of each instruction. In FIG. 9, the value of each constant is expressed in hexadecimal. Also, the legend fmtn (n=0–F)" shows the format code "n", while the legend "Rn (n=0–15)" shows the value stored in one of the registers in the register set 34. Of these, "R15" refers to the constant register 36.

Figure 10:
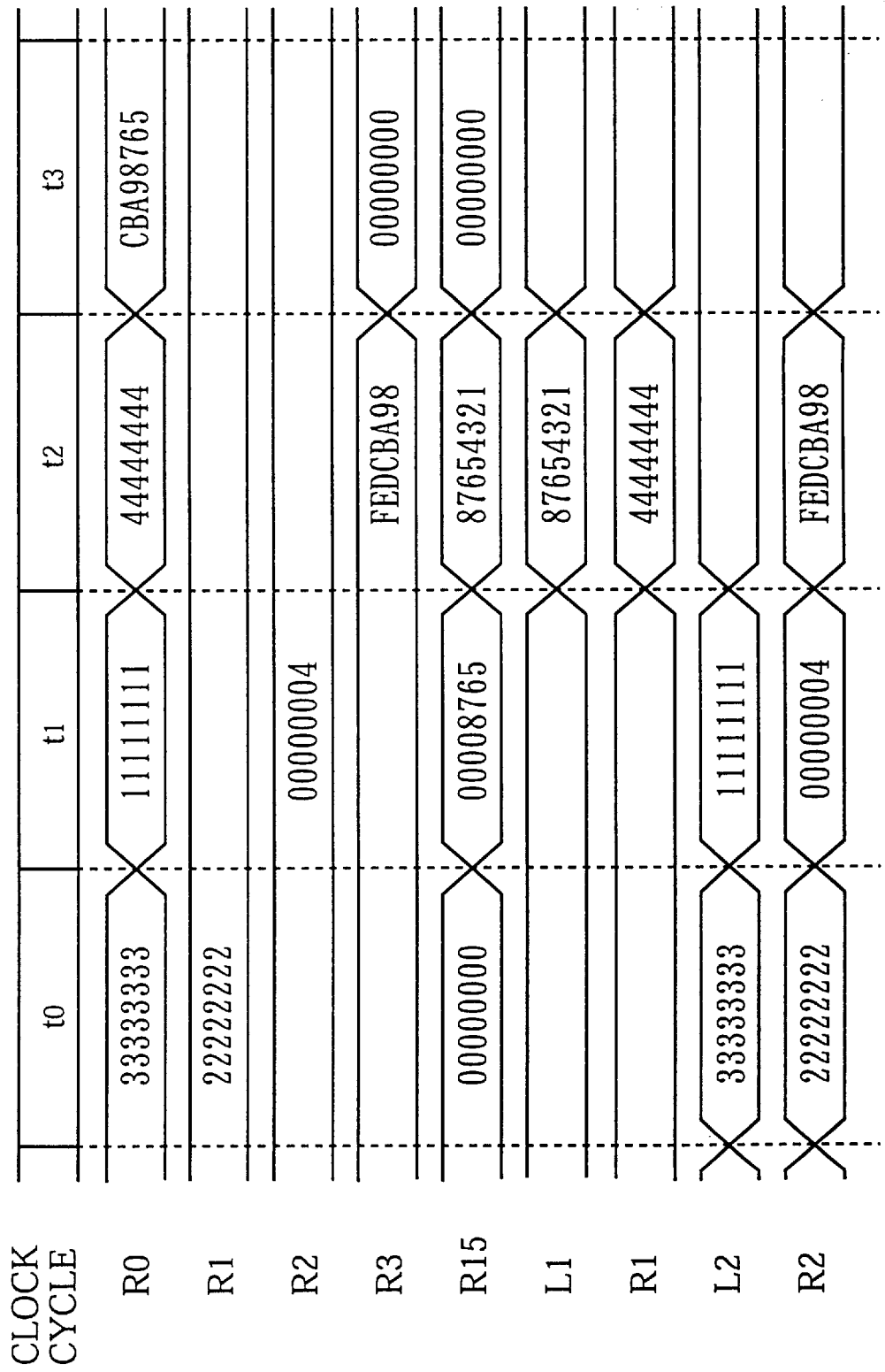
FIG. 10 is a timing chart showing the operation of the present processor when executing the program shown in FIG. 9.

FIG. 10 is a timing chart showing the operation of the present processor when executing the program shown in FIG. 9. This FIG. 10 shows the clock cycles, the content of the general registers R0–R3 and the register R15, and the data that flows on the four buses L1, R1, L2, and R2.

The following is an explanation of the operation of the present processor for each of the instructions 71 to 73, with reference to FIGS. 9 and 10.

Instruction 71

After the instruction 71 has been loaded into the instruction register 10, the present processor performs the operations shown in the clock cycles t0–t1 in FIG. 10. The format decoder 21 judges from the value "fmt4" of the P0.0 field 11 in the instruction register 10 that the present instruction is a twin operation instruction with the format code "4", and so controls the execution unit 30 so that the two operations described below are executed in parallel.

1. First Operation

The constant register control unit 32 controls its eight internal selectors 32a–32h so that the 16-bit constant (0x8765) located between the P1.0 field 12 to the P2.2 field 15 is stored in the lower 16 bits of the constant register 36 according to the storage method shown in FIG. 6B. Accordingly, the content of the register R15 changes from "0x00000000" to "0x00008765" as shown in the clock cycles t0–t1 in FIG. 10.

2. Second Operation

The second operation unit 38 receives an input of the stored value "0x33333333" of the general register R0 and the stored value "0x22222222" of the general register R1, and after subtracting the latter from the former, stores the result in the general register R0. As a result, the stored content of the general register R0 changes from the value "0x33333333" to the value "0x11111111" in the clock cycles to-tl shown in FIG. 10.

Instruction 72

Next, after the instruction 72 has been loaded into the instruction register 10, the present processor operates as shown in clock cycles t1–t2 in FIG. 10. The format decoder 21 judges from the value "fmt4" of the P0.0 field 11 in the instruction register 10 that the present instruction is a twin operation instruction with the format code "4", and so controls the execution unit 30 so that the two operations described below are executed in parallel.

1. First Operation

The constant register control unit 32 controls its eight internal selectors 32a–32h so that the 16-bit constant (0x4321) located between the P1.0 field 12 to the P2.2 field 15 is stored in the lower 16 bits of the constant register 36 according to the storage method shown in FIG. 6B. Accordingly, the content of the register R15 changes from "0x00008765" to "0x87654321" as shown in the clock cycles t1–t2 in FIG. 10.

2. Second Operation

The second operation unit 38 receives an input of the stored value "0x00000004" of the general register R2 and the stored value "0x11111111" of the general register R0, and multiplies the two together before storing the result in the general register R0. As a result, the stored content of the general register R0 changes from the value "0x11111111" to the value "0x44444444" in the clock cycles t1–t2 shown in FIG. 10.

Instruction 73

Next, after the instruction 73 has been loaded into the instruction register 10, the present processor operates as shown in clock cycles t2–t3 in FIG. 10. The format decoder 21 judges from the value "fmt7" of the P0.0 field 11 in the instruction register 10 that the present instruction is a twin operation instruction with the format code "7", and so controls the execution unit 30 so that the two operations described below are executed in parallel.

1. First Operation

The first operation unit 37 receives an input of the stored value "0x87654321" of the general register R15 and the stored value "0x44444444" of the general register R0, and adds the two together before storing the result in the general register R0. As a result, the stored content of the general register R0 changes from the value "0x44444444" to the value "0xCBA98765" in the clock cycles t2–t3 shown in FIG. 10.

2. Second Operation

The second operation unit 38 receives an input of the 8-bit constant ("0x00") that is located in the P1.0 field 12 and the P3.1 field 17 and allows this constant to pass so that it is stored in the general register R3. As a result, the content of the general register R3 changes from the previously held value "0xFEDCBA98" to "0x00000000", as shown for the clock cycles t2–t3 in FIG. 10.

As described above for the present processor, the 32-bit constant "0x87654321" is split into two parts that are arranged into the two instructions 71 and 72, with these parts being successively stored in the constant register 36 by shifting its stored value. This stored constant is then used according to the third instruction, instruction 73. By doing so, the procedure shown in the flowchart of FIG. 8 can be executed by the three instructions 71–73.

The following is an explanation of the operation of the present processor using a different program that deals with 16-bit constants.

FIG. 11 shows an example of a program that handles a 16 bit constant. This program is composed of the five instructions 74 to 78.

The operation of the present processor for the each of the instructions 74 to 78 is as described below.

Instruction 74

When the instruction 74 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.

1. First Operation

The constant register control unit 32 controls its eight internal selectors 32a–32h so that the 4-bit constant ("0x8") located in the P1.0 field 12 is stored in the lowest 4 bits of the constant register 36 according to the storage method shown in FIG. 6A.

2. Second Operation

The first operation unit 37 receives an input of the stored value of the general register R6, and allows this value to pass so that it is stored in the general register R1.

3. Third Operation

In the same way, the second operation unit 38 receives an input of the stored value of the general register R7, and allows this value to pass so that it is stored in the general register R2.

Instruction 75

When the instruction 75 has been loaded into the instruction register 10, the format decoder 21 judges from the value "fmt0" of the P0.0 field 11 in the instruction register 10 that the present instruction is a triple operation instruction with the format code "0", and so controls the execution unit 30 so that the three operations described below are executed in parallel.

1. First Operation

The constant register control unit 32 controls its eight internal selectors 32a–32h so that the 4-bit constant ("0x7") located in the P1.0 field 12 is stored in the lowest 4 bits of the constant register 36 according to the storage method shown in FIG. 6A. After this operation, the constant "0x87" is set in the lowest 8 bits of the constant register 36.

2. Second Operation

The first operation unit 37 receives an input of the stored values of the general register R0 and the general register R1, and adds these values together. The first operation unit 37 stores the addition result in the general register R1.

3. Third Operation

In the same way, the second operation unit 38 receives an input of the stored values of the general register R0 and the general register R2, and adds these values together. The second operation unit 38 stores the addition result in the general register R2.

Instructions 76, 77

Instructions 76 and 77 are executed in the same way as described above, and as a result the constant "0x8765" is stored in the lower 16 bits of the constant register 36.

Instruction 78

Once the instruction 78 has been loaded into the instruction register 10, the present processor operates in the same way as when processing instruction 73.

As described above for the present processor, the 16-bit constant "0x8765" is split into four parts that are arranged into the instructions 74–77, with these parts being successively stored in the constant register 36 by shifting its stored value. This stored constant is then used according to the fifth instruction, instruction 78.

Comparison with a Standard Processor

The following is a description of the processing performed by a standard processor for a program with the same processing content as shown in FIGS. 9 and 11 and a comparison with the processing of the present invention. Here, the expression "standard processor" refers to a processor that executes instructions whose word length is fixed at 32 bits, and is the same as the present processor, except for the lack of a construction, such as the constant register 36 and the constant register control unit 32, for accumulating constants that have been divided between instructions.

Figures 12A, 12B:
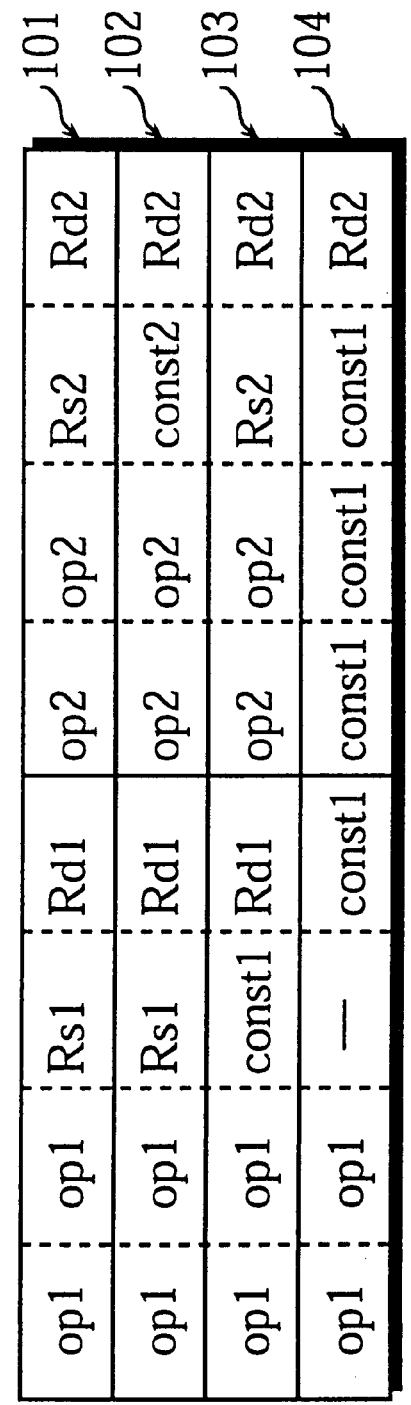
FIG. 12A shows the field definition of instructions that are executed by a standard processor.
FIG. 12B shows the instruction format of the instructions shown in FIG. 12A.

FIG. 12A shows the field definition of the instructions that are executed by a standard processor, while FIG. 12B shows the format of the instructions. Here, it is supposed that the standard processor can execute three types of twin operation instruction, instructions 101–103, and one type of single operation instruction, instruction 104.

FIG. 13 shows an example of a program to be executed by the standard processor. This program has the same processing content as the program shown in FIG. 9, which is to say the same procedure as the flowchart shown in FIG. 8.

As can be seen by comparing FIG. 13 and FIG. 9, the program for the standard processor includes two more instructions than the program for the processor of the present invention.

The reason the "NOP codes" are included in the instructions 105 and 106 is that the instruction 106 uses the operation result of the instruction 105, so that these instructions cannot be executed in parallel. Also, the reason the constant "0x87654321" is divided into an upper 16 bits and a lower 16 bits that are set in the constant register Ri (instructions 107 and 108) is that it is not possible to set a 32-bit constant and an operation code for a setting instruction in a single 32-bit instruction.

FIG. 14 also shows an example of a program for a standard processor. This program has the same processing content as program shown in FIG. 11. As can be seen by comparing FIG. 14 and FIG. 11, the program for the standard processor includes one more instruction than the program for the processor of the present invention.

As described above, the instructions executed by the processor of the present invention have a highly efficient field structure whereby a maximum of three operations can be indicated using a comparatively short word length of 32 bits.

Accordingly, with the processor of the present invention, a 16-bit or 32-bit constant that has been divided across a plurality of instructions can be accumulated in the constant register 36 to restore the constant to its original form, with it then being used for a branch operation or arithmetic logic operation. Accordingly, when a small region is available in an instruction, this region can be effectively used for locating a part of a constant, so that the code size of the program can be reduced compared with when the same processing is performed by a standard processor.

Modification

FIGS. 15A to 15D show the instruction formats of VLIW processors that are modifications of the present invention. In these figures, the smallest interval demarcated by the vertical lines represents one bit, while the legend "fmt" shows the format field.

Figure 15A:
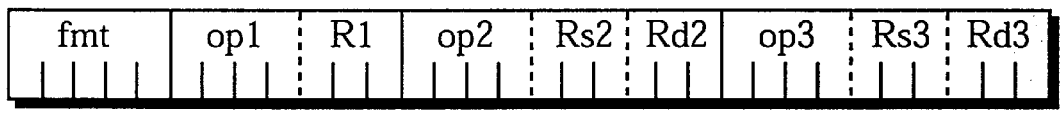
FIGS. 15A to 15D show modifications to the structure o the instructions executed by the VLIW processor of the present invention.
Figure 15B:
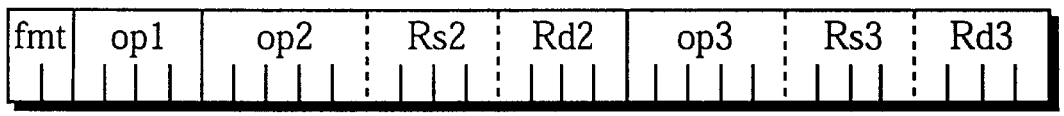
Figure 15C:
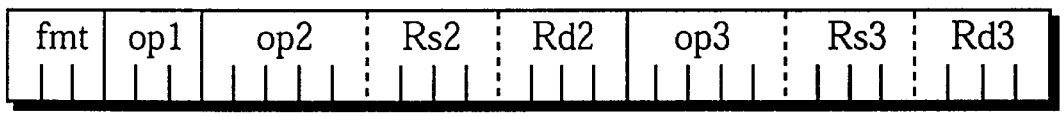
Figure 15D:
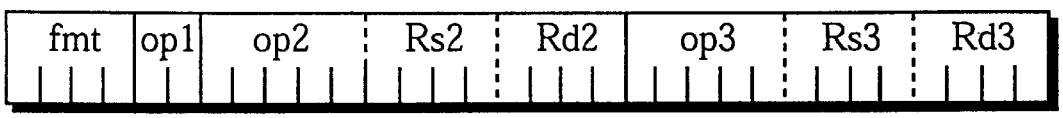

The instruction shown in FIG. 15A is composed of a 5-bit format field, a 7-bit operation field, and two 10-bit operation fields. The instruction shown in FIG. 15B, meanwhile, is composed of a 2-bit format field, a 4-bit operation field, and two 13-bit operation fields. The instruction shown in FIG. 15C is composed of a 3-bit format field, a 3-bit operation field, and two 13-bit operation fields. Finally, the instruction shown in FIG. 15D is composed of a 4-bit format field, a 2-bit operation field, and two 13-bit operation fields.

These four types of instruction have the following similarities with the instruction 50 described in the above embodiment and shown in FIG. 2A.
i. The instruction word length is fixed at 32 bits.
ii. Each instruction has one format field and three operation fields.
iii. The three operation fields do not have the same structure, which is to say, two of the operation fields have the same structure, while the remaining operation field is short.

As a result, these four types of instruction have the same characteristics as the instruction 50 described in the above embodiment.
I. The instructions have a field structure whereby a maximum of three operations can be indicated in spite of the comparatively short 32-bit word length.
II. A small operation field which is ideal for inserting small instructions, such as branch instructions that do not require two operands, is provided, so the code efficiency of instructions is high.
III. A format field is provided so that by giving an indication that a constant or one part of a constant is present in an operation field where an NOP instruction would normally need to be provided, the code size of a program can be reduced.

On the other hand, the four types of instructions described above also have the following characteristics which differ from those of the instruction 50 described in the above embodiment. The instruction shown in FIG. 15A has the advantages of an enlarged format field, meaning a greater number of instruction types can be defined, and of the ability to provide at least one operand in each of the three operation fields. The instructions shown in FIG. 15B to FIG. 15D, meanwhile, have the advantage of two enlarged operation codes ("op2" and "op3"), so that a greater variety of operations can be defined.

Figure 16:
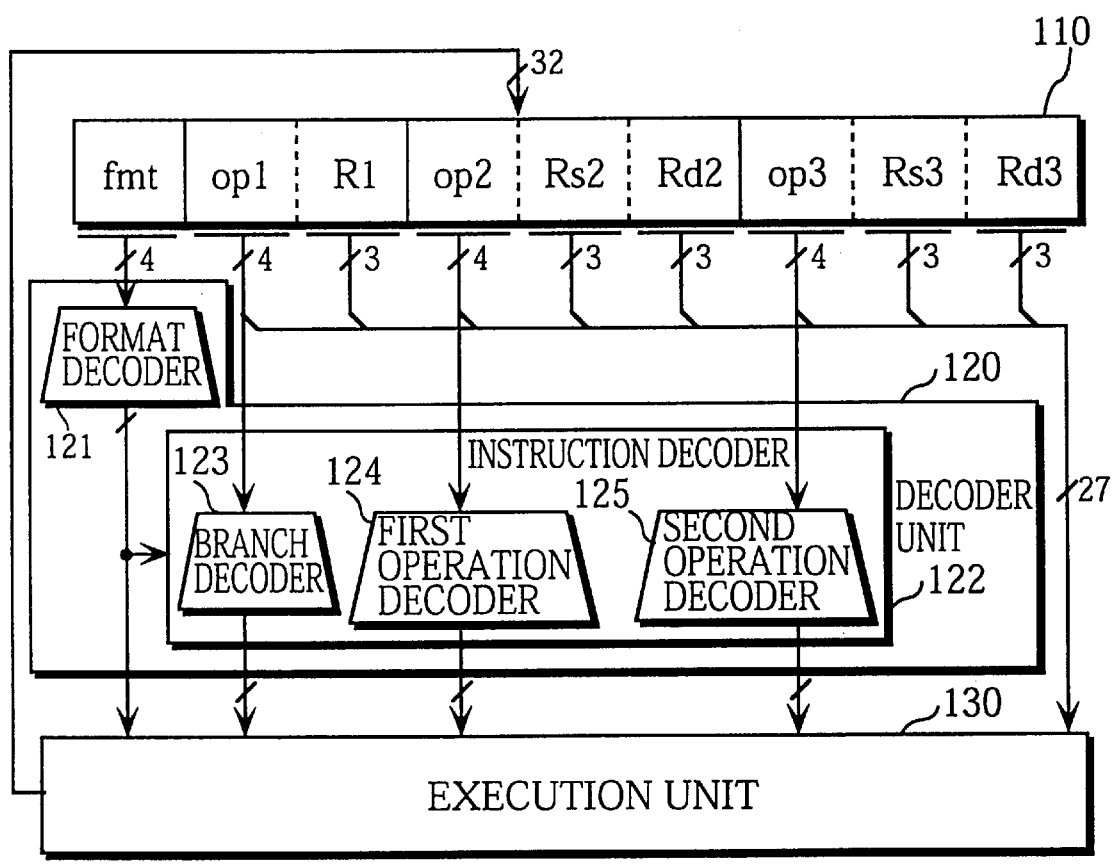
FIG. 16 shows a modification to the hardware construction of the present processor to enable the execution of the instruction shown in FIG. 15A.

FIG. 16 is a block diagram showing the construction of a VLIW processor of the present invention for executing the instruction shown in FIG. 15A. As can be seen by comparing this construction with the construction shown in FIG. 4, the fundamental construction of the processor is the same, although there are some differences in the connections between the instruction registers 10, 110 and the decoder units 20, 120. In this way, VLIW processors for executing the modified instructions shown in FIGS. 15A to 15D can be realized by making only partial changes to the VLIW processor described in the above embodiment.

The processor of the present invention has been explained by means of the embodiment given above, although it should be obvious that several further modifications are possible. Four examples of such are given below.

(1) The embodiment and above modification of the present invention all deal with the case where the instruction word length is 32 bits and a maximum of three operations are indicated, although the present invention is not limited to these numbers.

As one example, the instruction 50 shown in FIG. 2A may further include another 4-bit operation code and another 4-bit operand, making the total instruction word length 40 bits. By doing so, it becomes possible to define instructions with high code efficiency whereby a maximum of four operations can be executed by a single instruction with the comparatively short word length of 40 bits.

(2) The instruction 50 of the above embodiment only includes one field (the P1.0 field 52) that uses an implicit operand (the stored value of the constant register 36), although the present invention need not be limited to this, and so have two or more such fields. This can be handled by appropriately defining a new instruction format.

(3) In the above embodiment, an example dealing with a numerical constant is given, although it is of course equally possible for the invention to deal with a character constant. This is because a long character constant that is divided across a plurality of instructions can be accumulated by successively storing different parts of the character constant in the constant register 36.

(4) As can be seen from the instruction formats shown in FIGS. 2B to 2D of the above embodiment, only a 4-bit or a 16-bit constant can be stored in the constant register 36 in the above embodiment by a single instruction, although this is not a limitation for the present invention. As examples, it is equally possible to define an instruction format whereby a 12-bit or a 28-bit constant can be stored in the constant register 36 by a single instruction. To do so, it is only necessary to change the connection pattern of the peripheral circuits of the constant register 36.

Although the present invention has been fully described by way of examples with reference to accompanying drawings, it is to be noted that various changes and modifications will be apparent to those skilled in the art. Therefore, unless such changes and modifications depart from the scope of the present invention, they should be construed as being included therein.

What is claimed is:

1. A VLIW (Very Long Instruction Word) processor that decodes and executes an instruction that has at least three operation fields, of which a first operation field can only include one operation code for specifying an operation type and a second operation field includes a combination of one operation code and at least one operand used in an operation indicated by the second operation field, wherein a number of bits occupied by the first operation field in the instruction is less than a number of bits occupied by the second operation field, a number of bits occupied by the operation code in the first operation field is equal to a number of bits occupied by the operation code in the second operation field; and a third operation field occupies the same number of bits as the second operation field and includes a combination of one operation code and at least one operand, the VLIW processor comprising:

first decoding means for decoding the operation code in the first operation field;

first execution means for executing an operation indicated by the operation code in the first operation field in accordance with a decoding result of the first decoding means; second decoding means for decoding the operation code in the second operation field;

second execution means for executing the operation indicated by the operation code in the second operation field on data which is indicated by the operands in the second operation field, in accordance with a decoding result of the second decoding means;

third decoding means which decodes, when an operation code is present in the third operation field, the operation code in the third operation field; and third executing means for executing an operation indicated by the operation code in the third operation field on data which is indicated by the operands in the third operation field, in accordance with a decoding result of the third decoding means.

2. The VLIW processor of claim 1, wherein the first executing means controls a control flow of a program including the instruction.

3. The VLIW processor of claim 2, wherein the second executing means controls transfer of the data that is indicated by the operands included in the second operation field, and the third executing means controls executes an arithmetic logic operation on the data that is indicated by the operands included in the third operation field.

4. A VLIW processor that decodes and executes an instruction that has at least two operation fields, of which a first operation field can only include one of (i) a single operation code for specifying an operation type and (ii) a constant, and a second operation field includes one of (i) a combination of one operation code and at least one operand used in an operation indicated by the second operation field and (ii) a constant, the VLIW processor comprising:

first decoding means which decodes, when an operation code is present in the first operation field, the operation code in the first operation field;

first executing means for executing an operation indicated by the operation code in the first operation field, in accordance with a decoding result of the first decoding means;

second decoding means which decodes, when an operation code is present in the second operation field, the operation code in the second operation field; and second executing means for executing an operation indicated by the operation code in the second operation field on data which is indicated by the operands in the second operation field, in accordance with a decoding result of the second decoding means.

5. The VLIW processor of claim 4, wherein the instruction also includes a format field including a format code indicating whether only a constant is located in the first operation field and whether only a constant is located in the second operation field, the VLIW processor further comprising:

format decoding means for decoding the format code; and constant storage means for extracting, when a decoding result of the format decoding means shows that only a constant is present in at least one of the first operation field and the second operation field, the constant in the instruction and storing the extracted constant.

6. The VLIW processor of claim 5, wherein wherein a number of bits occupied by the first operation field in the instruction is less that a number of bits occupied by the second operation field.

7. The VLIW processor of claim 6, wherein a number of bits occupied by the operation code in the first operation field is equal to a number of bits occupied by the operation code in the second operation field.

8. The VLIW processor of claim 7, wherein the instruction includes three operation fields, wherein a third operation field in the three operation fields occupies a same number of bits as the second operation field and includes a combination of one operation code and at least one operand, the VLIW processor further comprising:

third decoding means which decodes, when an operation code is present in the third operation field, the operation code in the third operation field; and third executing means for executing an operation indicated by the operation code in the third operation field on data which is indicated by the operands in the third operation field, in accordance with a decoding result of the third decoding means.

9. The VLIW processor of claim 8, wherein the first executing means controls a control flow of a program including the instruction.

10. The VLIW processor of claim 9, wherein the second executing means controls transfer of the data that is indicated by the operands included in the second operation field, and the third executing means controls executes an arithmetic logic operation on the data that is indicated by the operands included in the third operation field.

11. The VLIW processor of claim 10, wherein the format field, the first operation field, the operation code in the second operation field, each operand in the second operation field, the operation code in the third operation field, and each operand in the third operation field each occupy n bits in the instruction.

12. The VLIW processor of claim 11, wherein the instruction is 32 bits long and n is 4.

13. A VLIW processor that decodes and executes an instruction that has at least three operation fields, of which a first operation field includes one operation code for controlling a control flow of a program including the instruction, a second operation field includes an operation code for controlling a data transfer, and a third operation field includes an operation code for controlling an arithmetic logic operation on data, the VLIW processor comprising:

first decoding means for decoding the operation code in the first operation field;

first execution means for controlling the control flow of the program as indicated by the operation code in the first operation field, in accordance with a decoding result of the first decoding means;

second decoding means for decoding the operation code in the second operation field;

second execution means for controlling the data transfer indicated by the operation code in the second operation field, in accordance with a decoding result of the second decoding means;

third decoding means for decoding the operation code in the third operation field; and third execution means for executing the arithmetic logic operation indicated by the operation code in the third operation field, in accordance with a decoding result of the third decoding means.

14. The VLIW processor of claim 13, wherein a number of bits occupied by the first operation field in the instruction is less that a number of bits occupied by the second operation field and the number of bits occupied by the third operation field.

15. The VLIW processor of claim 14, wherein a number of bits occupied by the operation code in the first operation field is equal to a number of bits occupied by the operation code in the second operation field and a number of bits occupied by the operation code in the third operation field.

16. The VLIW processor of claim 14, wherein the second operation field occupies a same number of bits as the third operation field.

17. The VLIW processor of claim 14, wherein the instruction is 32 bits long.

18. A VLIW processor that decodes and executes an instruction that has a format field and at least three operation fields, of which a first operation field can only include one of (i) an operation code for controlling a control flow of a program including the instruction and (ii) a constant, a second operation field includes one of (i) an operation code for controlling a transfer of data and (ii) a constant, and a third operation field includes one of (i) an operation code for controlling an arithmetic logic operation on data and (ii) a constant, the format field including a format code that indicates whether a constant is located in the first operation field, whether a constant is located in the second operation field, and whether a constant is located in the third operation field;

the VLIW processor comprising:

first decoding means for decoding the operation code in the first operation field;

first execution means for executing a control of the control flow of the program as indicated by the operation code in the first operation field, in accordance with a decoding result of the first decoding means;

second decoding means for decoding the operation code in the second operation field;

second execution means for executing a control of the data transfer indicated by the operation code in the second operation field, in accordance with a decoding result of the second decoding means;

third decoding means for decoding the operation code in the third operation field;

third execution means for executing the arithmetic logic operation indicated by the operation code in the first operation field, in accordance with a decoding result of the third decoding means;

format decoding means for decoding the format code; and constant storage means for extracting, when a decoding result of the format decoding means shows that a constant is present in at least one of the first operation field, the second operation field, and the third operation field, the constant in the instruction and storing the extracted constant.

19. The VLIW processor of claim 18, wherein the instruction is 32 bits long.

20. A VLIW processor, comprising:

fetch means for fetching an L-bit instruction that includes n operation fields; and n operation units which are each associated with a different one of the n operation fields in the fetched instruction and each independently execute an operation indicated in the associated operation field in parallel with each other;

the VLIW processor being characterized by the n operation fields not all being a same size, and by L not being an integer multiple of n.

21. The VLIW processor of claim 20, wherein at least one of the n operation fields has a different length to other operation fields in the n operation fields.

22. The VLIW processor of claim 21, wherein n is 3 and L is 32.

23. The VLIW processor of claim 20, wherein a number of operands included in at least one operation field out of the n operation fields is different to a number of operands in other operation fields in the n operation fields.

24. The VLIW processor of claim 23, wherein n is 3 and L is 32.

25. The VLIW processor of claim 20, wherein the n operation fields include at least one operation field composed of only an operation code and at least one operation field composed of an operation code and at least one operand.

26. The VLIW processor of claim 25, wherein n is 3 and L is 32.

27. A VLIW (Very Long Instruction Word) processor that decodes and executes an instruction that has a format field holding a format code specifying an instruction format, a first operation field holding only an operation code specifying an operation type, and a second and third operation field, each holding a combination of two or more of an operation code, an operand and a constant the VLIW processor comprising:

a format decoder for decoding the format code in the format field, wherein the decoding result of the format decoder indicates the location of the operation code, the operand and the constant in the third and second operation field;

a first operation decoder for decoding the operation code in the first operation field;

a first operation unit for executing an operation indicated by the operation code in the first operation field in accordance with the decoding result of the first operation decoder;

a second operation decoder for decoding the operation code in the second operation field;

a second operation unit for executing an operation indicated by the operation code in the second operation field in accordance with the decoding result of the second operation decoder;

a third operation decoder for decoding the operation code in the third operation field; and a third operation unit for executing an operation indicated by the operation code in the third operation field in accordance with the decoding result of the third operation decoder.

28. The processor of claim 27 further comprising a constant register for storing constants, wherein constants held in the second and third operation field are stored in the constant register in accordance with the decoding result of the format decoder.

29. The processor of claim 28 wherein constants held in the second and third operation field of a plurality of instructions accumulate in the constant register to form a long word length constant.

30. The processor of claim 29 wherein the long word length constant is used in an operation in a later instruction.

31. The instruction of claim 30 wherein the format code, operation code, operand and constant are each n-bits long, and the instruction is L-bits long.

32. The instruction of claim 31 wherein n is 4 and L is 32.

33. The processor of claim 27 wherein the first operation field of the instruction holds one of an operation code specifying a branch operation and a constant.

34. The processor of claim 33 further comprising a constant register for storing constants, wherein constants held in the first, second and third operation field are stored in the constant register in accordance with the decoding result of the format decoder.

35. The processor of claim 34 further comprising a program counter for indicating the address of the next instruction to be decoded and executed by the processor, wherein the program counter uses a constant stored in the constant register to determine the absolute or relative address of the next instruction in accordance with the decoding result of the first operation decoder.

36. The processor of claim 35 wherein constants held in the first, second, and third operation field of a plurality of instructions accumulate in the constant register to form a long word length constant and wherein the program counter uses the long word length constant to determine the absolute or relative address of the next instruction.

37. The instruction of claim 36 wherein the format code, operation code, operand and constant are each n-bits long, and the instruction is L-bits long.

38. The instruction of claim 37 wherein n is 4 and L is 32.

39. The instruction of claim 27 wherein the format code, operation code, operand and constant are each n-bits long, and the instruction is L-bits long.

40. The instruction of claim 39 wherein the format field and the first operation field are each n-bits long and the second and third operation fields are each at least 2n-bits long.

41. The instruction of claim 40 wherein n is 4 and L is 32.

* * * * *